March 24, 1964   C. M. PETERS ETAL   3,125,881
RATE OF FLOW METER
Filed March 9, 1960
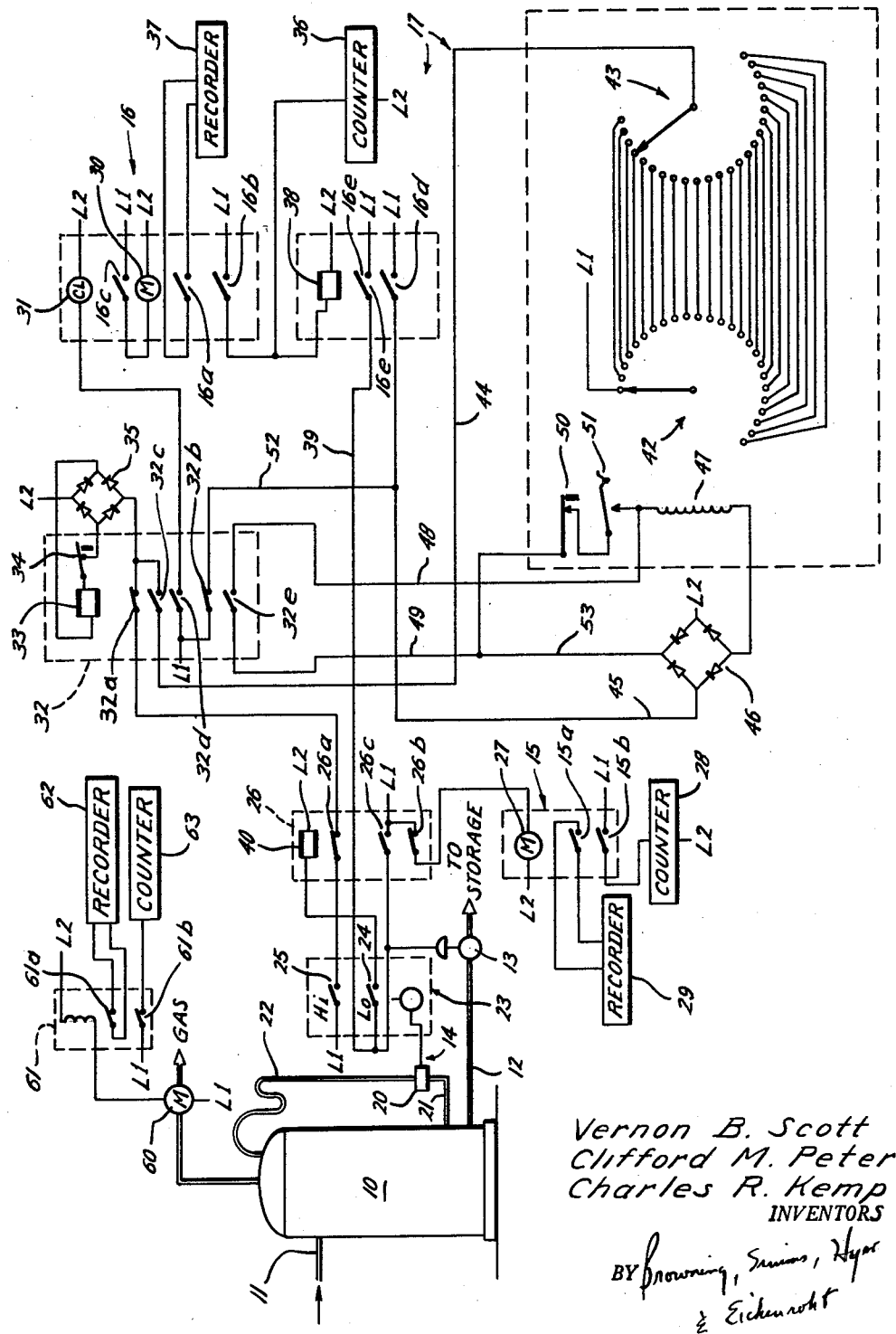
Vernon B. Scott
Clifford M. Peters
Charles R. Kemp
INVENTORS
BY Browning, Simmons, Hyer
& Eichenroht
ATTORNEYS

United States Patent Office 3,125,881
Patented Mar. 24, 1964

3,125,881
RATE OF FLOW METER
Clifford M. Peters, Vernon B. Scott, and Charles R. Kemp, Longview, Tex., assignors to U.S. Industries, Inc., New York, N.Y., a corporation of Delaware
Filed Mar. 9, 1960, Ser. No. 13,780
13 Claims. (Cl. 73—223)

This invention relates to a rate of flow meter particularly adapted to the measurement of the rate of flow or volume of a liquid which is continuously flowing into a vessel. In one of its aspects, it relates to such type of meter which is especially suitable for measuring the production of petroleum from the well by employing instrumentation to control the operation of a separator in such a way that it operates on a cyclic filling and dumping schedule so that a measurement of the filling time and the number of dumps or fills permits a determination of the rate of flow into the separator.

In many instances, it is desirable to measure the rate of production of oil and gas from one or more wells. For example, it is conventional to divert the production of a well through a so-called test system which includes a test separator for separating the oil and gas produced into separate streams. By measuring the volume or rate of flow of these streams, the total production from the well, as well as a gas-oil ratio, can be determined. Several different types of meters have been used for making these measurements, but these have been relatively expensive, particularly those used for measuring the volume of oil. For example, positive displacement meters can be used but these are among the more expensive meters. However, they do have the advantage that they can measure flow without interrupting the same. Some types of batching meters can also measure the flow without interrupting it but to do so, they require a surge system or a special double barrel arrangement which makes them relatively expensive. Batch type metering separators are also known but they too interrupt the flow from the well. It would therefore be desirable to possess a meter which could be installed on a conventional lease at a relatively modest cost to meter the production from wells without periodically interrupting the flow of the same and it is an object of the invention to provide such a meter.

Another object of the invention is to provide a meter which employs an ordinary production separator in combination with a control system which measures the time required for a measured quantity of liquid to flow into the separator thereby ascertaining the rate of flow. Since almost all oil field leases are equipped with a separator, the control system can be added at a minimum of expense to provide the meter.

Another object of the invention is to provide such a meter in which surges of production or erratic fluctuations in liquid level in the separator or vessel do not interfere with the metering function.

Another object is to provide such a meter which is not affected by foaming of the liquid being metered.

Another object is to provide such a meter which can measure in terms of numbers of separator fill volumes or in terms of barrels or other units of measure.

Another object is to provide a meter which determines the rate of flow of liquid into a vessel without interrupting such flow by cyclically causing the vessel to fill and dump, and then measuring the time required to fill the vessel with a measured quantity of liquid, whereby integration of time and quantity can be made to yield the rate of flow from whence the total volume produced can be determined.

Other objects, advantages and features of the invention will be apparent to those skilled in the art from a consideration of the specification, the claims and the annexed drawing, wherein a preferred embodiment of the invention is shown in connection with the metering of oil passing through a separator. In this connection, while frequent reference has been made herein to the metering of oil on a lease and particularly to the use of a separator for that purpose, it will be understood that the invention is applicable to the measurement of the rate of flow of other liquids and that vessels other than a conventional separator can be employed as a part of the combination.

As a matter of convenience, a power or current source will be designated as L1 in the drawing and the return as L2.

Referring now to the drawings, a general description will be given followed by a detailed description of the illustrated preferred embodiment. Thus, a vessel 10 is provided with an inlet 11 and an outlet 12 controlled by a motor valve 13. A means, designated generally by the numeral 14, is provided for sensing when the quantity of liquid in the vessel reaches predetermined high and low values. This means sends signals responsive to the liquid quantities reaching these high-low values, to open and close valve 13. As a result a predetermined quantity of liquid will be accumulated in the vessel 10 while valve 13 is closed and this will be a measure of the rate of flow into the vessel. Once this quantity has accumulated, valve 13 opens and the accumulated liquid, plus that flowing into the vessel while the valve is opened, is dumped. This means that the rate of flow through the outlet and from the vessel must be greater than that into the vessel so that the quantity of liquid in the vessel will decrease to the predetermined low value at which time a signal will be sent by the sensing means to close valve 13. The quantity of liquid in the vessel will then increase at a rate equal to the flow into the vessel and and upon the quantity reaching the predetermined high value, a signal will be sent by the sensing means to open valve 13. Means, designated generally by the numeral 15, are also provided for measuring the time required for the predetermined quantity of liquid to accumulate in the vessel with the valve 13 closed. Also, a means 16 is provided to measure the number of quantities of liquid so accumulated. Then at the end of any period of time, the number of quantities of liquid accumulated and the time to accumulate them are both known so that the rate of flow can be readily determined. For example, if the size of the vessel and the sensing means is set so that vessel 10 accumulates 10 barrels of liquid during its fill period and if the time required to accumulate that quantity is one hour, then the rate of flow is 10 barrels per hour. On the other hand, if there has been 40 such accumulations recorded over a period of one day and the total time actually required to accumulate the quantities is ten hours, then the rate of flow is 40 barrels per hour and the total flow for the day is 960 barrels. The number of accumulations (hereinafter called "fills") can be counted as above indicated or, if desired, each fill can be converted by a suitable means 17 to other units of volume or mass such as barrels.

Referring now in more detail to the embodiment shown in the drawing, the liquid sensing means preferably comprises a differential pressure cell 20 having one side exposed to pressure in a lower part of the vessel as by pipe 21 and the other side to pressure in an upper part of the vessel by pipe 22 to balance out the effect of static pressure on the cell. The cell is equipped with a gap switch 23 which actually includes a low level switch 24 and a high level switch 25. The gap switch is adjustable so that the upper and lower limits of its operation can be varied so that the weight of fluid measured during each cycle can be adjusted to a suitable value such as a given number of barrels. Thus, when the weight of the fluid reaches a predetermined low value, switch 24 will open and as the weight of liquid in the vessel 10 increases, switch 24 will first close and thereafter the high level switch 25 will close when the predetermined weight of liquid has accumulated in the vessel. It will be noted that the presence of foam will not result in errors because the weight of the liquid (including that in the foam) is being measured.

As a part of a means for controlling opening and closing of valve 13 and also for stopping and starting the timing function of timing means 15, a relay 26 is provided. This relay has normally closed contacts 26a and 26b and normally open contacts 26c. Relay 26 will be in its normal position while valve 13 is closed and therefore current can flow from source L1 through closed contacts 26b to the motor 27 of timing means 15. As this motor turns, contacts 15a and 15b will go through a cycle of opening and closing over a preselected time such as 0.001 of a day (86.4 seconds). When contacts 15b close, current is applied to counter 28 to actuate it so as to reflect that a 0.001 of a day, or other preselected time interval, has elapsed with valve 13 closed. Similarly, closure of contacts 15a completes a circuit to recorder 29 so that the latter can also reflect that the time interval has lapsed. As will be discussed in greater detail below, the timing means 15 cause time intervals to be recorded only while valve 13 is closed and therefore the number of time increments counted by counter 28 or recorded by recorder 29 is a measure of the time required for accumulation of the predetermined quantity of liquid in vessel 10. Timing means other than of the interval type can be employed.

The counting means 16 actually counts the number of times valve 13 is actuated and in combination with multiplier means 17, can produce an output which is an accumulative total of the number of barrels or other units of volume contained in a series of fills. The illustrated form of the counting means can be termed a pulse generator in that it includes a motor 30 which closes contacts 16a and 16b at timed intervals while the motor is running. The motor is controlled by contacts 16c in the power circuit of the motor and these contacts in turn are opened and closed by a clutch 31. In this particular embodiment, clutch 31 is energized by the closing of the high level contact 25 but indirectly through a stepping type relay 32. Relay 32 is of the type which, when its coil 33 is energized, cocks a spring loaded ratchet mechanism which is released upon removal of power from the coil. Such release causes the contacts of the relay to reverse their positions. The relay also includes a self-interrupter switch 34 in series with the coil so that upon energizing the coil, its armature moves to open switch 34 to thereby de-energize the coil. Thus upon application of an A.C. signal via high level switch 25 to bridge 35, the resulting flow of direct current is through coil 33, causing its armature to move to cock the ratchet mechanism which movement also results in opening switch 34 thereby interrupting power to coil 33. When this happens, the normally closed contacts 32a and 32b are opened and normally open contacts 32c, 32d and 32e are closed. Opening of contacts 32a prevents further application of power to the coil via high level switch 25 so that should this switch still be closed after relay 32 has been actuated as above described or should it open and reclose due to flow surges or other reasons, a spurious signal will not be sent to relay 32 to cause it to return to its normal position before the counting function has been completed.

Thus it will be seen that when high level switch 25 closes, power is applied via contacts 32a and rectifier 35 to coil 33, causing the points of relay 32 to be reversed. This applies power through closed contacts 32d to clutch 31 of the pulse generator, causing points 16c to close and motor 30 to begin running. As the motor runs, it periodically closes contacts 16a and 16b thereby applying pulses to counter 36 and also closing the circuit to recorder 37 so that the latter can record the number of pulses. Closure of contacts 16b also periodically energizes coil 38 which in turn periodically closes contacts 16d and 16e. The closure of contacts 16e applies power via wire 39 and closed low level switch 24 to coil 40 of relay 26. Energization of this coil closes contacts 26c and thereby locks in the relay and opens valve 13. At the same time, contacts 26b are opened to stop the timing means 15. Also, contacts 26a are opened to prevent the high level switch from sending any further signals until coil 40 has been de-energized by opening of the low level switch 24.

The multiplying means 17 for converting the fills of vessel 10 into other units of volume or weight is illustrated as including a stepping switch 42. The stepping switch has its contact arm connected to a current source so that power can be applied by the arm to the points of the switch. These points are connected in parallel to the points of a selector switch 43 which in turn has its contact arm connected via wire 44 and contacts 32c to the input of bridge 35. Accordingly, when switch 42 has been stepped until its contact arm is on a point which is connected to a point being contacted by the arm of switch 43, power will be applied to bridge 35 to energize coil 33 and cause the stepping relay 32 to return to its normal position.

Stepping switch 42 is connected to the pulse generator in such a manner that the switch is caused to step one position each time a pulse is generated. This pulse is generated by closing contacts 16d at timed intervals under the control motor 30 which applies power via wire 45 to bridge 46. The resulting flow of D.C. current energizes coil 47 thereby causing the stepping switch to advance one position. The circuit for coil 47 is completed by wire 48, contacts 32e and wire 49. The stepping switch is of the type which upon application of power to its coil 47, will cause a ratchet mechanism to be cocked so that upon removal of power from the coil, the ratchet mechanism will cause the switch to step. Therefore, the stepping switch will receive pulses from contacts 16d and will be stepped one position each time these contacts are closed. When the stepping switch contact arm makes contact with a point connected to the point which the arm of selector switch 43 contacts, relay 32 will be returned to its normal position which opens contacts 32d to stop the pulse generator. By turning the selector switch arm 43 to a preselected contact point, the counting means 16 can be caused to emit a preselected number of pulses for each fill of vessel 10 thereby causing counter 36 to be advanced a corresponding number of positions. For example, if vessel 10 requires five barrels of liquid to fill it from its low to its high levels, selector switch 43 can be set with its arm in contact with the fifth contact so that contacts 16b will be closed 5 times, thereby advancing counter 36 five positions to indicate five barrels. Similarly, the contacts for recorder 37 will be closed 5 times so the recorder can record five barrels.

In order to cause the stepping switch to home after the counting function has been completed, it is preferably equipped with the conventional self-interrupter switch 50 and off-normal switch 51 which are connected in series with coil 47. This series arrangement is then connected to a power source through a pair of contacts 32b so that upon relay 32 returning to normal position responsive to the stepping switch signalling the completion of the counting function, the switch is homed. Thus, the normally closed contacts 32b are connected to a power source L1 and also to bridge 46 via a wire 52 and wire 45. Then when contacts 32b are closed, power will be applied to bridge 46, coil 47, off-normal switch 51 and self-interrupter switch 50 and thence via wire 53 to the other terminal on the bridge. Accordingly, closure of contacts 32b causes the stepping switch to home to the postiion shown in the drawing.

In discussing the operation of the illustrated embodiment, let it be assumed that the amount of liquid in vessel 10 has fallen to a point such that the low level switch 24 has just opened. Opening of this switch de-energizes coil 40 causing contacts 26c to open and contacts 26b to close thereby respectively closing valve 13 and starting the timing means. As the liquid flows into the vessel, operation of the timing means causes counter 28 and recorder 29 to record time increments until the vessel has been filled with a predetermined quantity of liquid. As the liquid level increases, the low level switch 24 will close, followed by the high level switch when the predetermined large quantity of liquid has flowed into the vessel. Closure of the latter switch applies power to bridge 35 to energize coil 33 and reverse the contacts of relay 32 from the positions shown in the drawings. This reversal applies power via contact 32d to the pulse generator of the counting means 16 to actuate clutch 31 and start the timing motor 30. At the same time, closure of contacts 32c closes a circuit to selector switch 43. As timing motor 30 turns, its contacts 16d periodically close to apply power pulses to coil 47 and thereby cause the stepping switch to advance one position per pulse. At the same time, power is applied via contacts 16e through closed low level switch 24 to energize coil 40. This closes contacts 26c to lock in the relay and opens contacts 26b to stop timing means 15. Closure of contacts 26c also applies power to open valve 13 to start the dump. While the dump is progressing, counting means 16 continues to send out pulses to step switch 42 until its contact arm closes the circuit to apply power via selector switch 43 and contacts 32c to bridge 35 to cause ratchet relay to return to its normal position. This turns off timing motor 30 and also closes contacts 32b to apply power to the stepping switch mechanism to cause the stepping switch to home. It will be noted that it is immaterial whether or not the high level switch 25 has been opened prior to the foregoing sequence of events because relay 40 will be locked in via contacts 26c and cannot return to its normal position so as to start the timing means and to close valve 13 until the low level switch 24 opens. At that time, power is removed from coil 40 which opens contacts 26c to close valve 13 and also contacts 26b will be closed to again start the timing means 15 to measure the increments of time required to accumulate the predetermined weight of liquid in vessel 10.

The gas separated in vessel 10 can be metered by meter 60 which is of the type having contact points which are closed by the meter each time a predetermined volume of gas passes through the meter. The closure of these contact points energizes the coil of relay 61 causing contact 61a and 61b to also close. This permits the gas recorder 62 and the gas counter 63 to record the number of contact closures and thus the volume of gas metered.

If it is desired that counting means 16 merely record the number of fills, selector switch 43 can be set with its arm in contact with the first contact so that the stepping switch will cause relay 32 to reverse when only one pulse has been counted. Alternatively, the stepping switch and relay can be omitted entirely and wire 45 connected directly to wire 44 so that upon closure of contacts 16d, a pulse will be applied through contacts 32c to bridge 35 to cause the relay to return to its normal position. Also, while contacts 16e and 16d are shown as part of a separate relay actuated by coil 38, these contacts could be opened and closed directly by motor 30 thereby eliminating coil 38. Similarly, while recorders and counters have been shown, it is not necessary to use both. In any event, it will be seen that the control system of this invention provides output pulses which are a measure of the rate of flow in line 11 and these pulses can be fed into any desired data processing or recording system.

It is also contemplated that the output pulses from timing means 15 and counting means 16 can be fed into a suitable integrating system so as to be able to read directly either or both of the instantaneous rate of flow or the average rate of flow over a period of time. Moreover, it is possible to use a pen-type recorder having its chart drive mechanism connected to a power source through contacts 26b so that the chart drive mechanism is actuated only while valve 13 is closed in the same way that timing means 15 is actuated only while the valve is closed. In such case, high level switch 25 will also be connected to coil 40 to energize the same upon the level reaching a predetermined high thereby opening valve 13 and turning off the chart drive mechanism. This will also close contacts 26c to lock in the relay until the lower level switch opens. The pen of the chart recorder would then be connected so that its movement would be responsive to the pressure differential across differential pressure cell 20. The resulting curve would be semi-sawtooth in configuration and by integration of the area under the curve, the rate of flow would be determined.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A rate of flow meter comprising a vessel having an inlet connected to introduce a continuous stream of liquid into the upper part of the vessel, and an outlet; a valve in the outlet; means to open the valve when a predetermined volume of liquid accumulates in the vessel; means for causing the liquid to flow through the outlet faster than it enters through the inlet; means for closing the valve when the volume of liquid in the vessel drops to a predetermined amount thereby causing the vessel to accumulate a predetermined volume of liquid each time the outlet valve is closed; and means for measuring the total amount of time the valve is closed and the number of times the valve is opened thereby providing the rate of flow of liquid into the vessel.

2. A rate of flow meter comprising a vessel having an inlet line connected thereto to introduce a continuous stream of fluids into an upper part of the vessel and a separate outlet line connected to a lower part of the vessel; a valve in the outlet line; means for opening the valve when the weight of liquid in the vessel reaches a predetermined amount; means for causing the liquid to flow from the vessel into the outlet at a higher rate than it is entering the vessel; means for closing the outlet valve when the weight of liquid in the vessel drops to a predetermined amount; and means for measuring the total amount of time the outlet valve is closed and means for counting the number of times said valve is actuated to thereby determine the weight of liquid entering the vessel during the time interval measured.

3. The meter of claim 2 wherein said counting means includes multiplying means for converting the number of times the valve is actuated into units of volume or weight representative of the difference in the weight of liquid between said high and low weight values thereof.

4. A rate of flow meter comprising a vessel; an inlet line connected to introduce an unseparated well effluent in a continuous stream into the vessel; an outlet for gas in an upper part of the vessel; a liquid outlet line connected to a lower part of the vessel; a valve in the liquid outlet line; means for opening the valve, when a predetermined volume of liquid has entered the vessel, to allow the gas in the vessel to rapidly force the liquid out of the vessel through the outlet line; means for closing the valve when the liquid level in the vessel has been lowered a predetermined amount; timing means to record the time the valve is closed; and means for recording the number of times that liquid is discharged from the vessel to thereby determine the volume per time rate of flow of liquid into the vessel.

5. The meter of claim 4 wherein a relay is provided between the means for opening the valve and the means for recording the time the valve is closed operable after the first signal from the former to the latter to prevent the sending of further signals due to liquid level surges and the like in the vessel, said relay being connected to the means for closing the valve when the liquid level drops a predetermined amount so that a signal from the latter renders the relay inoperative to interrupt signals from the means for opening the valve.

6. A rate of flow meter comprising a vessel having an inlet connected to receive a continuous stream of liquid, and a separate outlet; a valve in the outlet; signaling means for sending signals responsive to the vessel containing a predetermined maximum and minimum quantity of liquid; means responsive to the signals to open the valve when the quantity of liquid is a maximum; means for discharging the liquid through the outlet at a higher rate than it enters the vessel; means responsive to the signaling means to close the valve in the outlet line when the quantity of liquid in the vessel reaches the predetermined minimum; means for recording the time the valve is closed; and means for recording in convenient units of volume the total volume of liquid accumulated in the vessel for the total period of time that the outlet valve is closed, the units being a multiple of the number of times the outlet valve is opened, said means comprising recorder means and means connected to the recorder means for generating a predetermined number of pulses each time the outlet valve is opened, each pulse indicating the accumulation in the vessel of a predetermined unit of volume of the liquid so that the rate of flow of the liquid into the vessel is recorded in the desired units of volume for the period of time indicated by the time recording means.

7. The meter of claim 6 wherein the pulse generating means includes a pulse generator generating pulses at timed intervals, circuit means for energizing the pulse generator in response to the discharging of liquid from the vessel, and pulse counting means including a switch connected in said circuit to open the same after the pulse generator has generated a predetermined number of pulses.

8. The meter of claim 7 wherein the pulse counting means includes step switch means connected to the pulse generator to be stepped in accordance with the pulses from the pulse generator, and a circuit connecting a source of power through the step switch means to the switch in said pulse generator circuit to open the last mentioned switch after the step switch has been stepped a predetermined number of times.

9. A rate of flow meter comprising a vessel having an inlet connected to receive a continuous stream of liquid and a separate outlet; a valve in the outlet; means for sensing the amount of liquid in the vessel and for sending signals to open the valve and discharge the liquid from the vessel when the liquid in the vessel reaches a predetermined level and to close the valve when the liquid level in the vessel drops to a predetermined level so that a given volume of liquid is accumulated each time the valve is closed; means for recording the time the valve is closed and means for recording each unit of volume of liquid accumulated each time the valve opens so that the flow rate can be read directly as units of volume of liquid produced during the time indicated on the time recording means, said volume recording means comprising a pulse generator, first circuit means connecting the pulse generator to the sensing means to actuate the pulse generator responsive to a signal from the sensing means, a switch in said first circuit means and pulse counting means connected to said pulse generator and said switch and operable to count pulses from the pulse generator and, upon these reaching a predetermined number, opening said switch to interrupt the pulse generator.

10. A rate of flow meter comprising a vessel having an inlet connected to receive a continuous stream of liquid, and a separate outlet; a valve in the outlet; means for sensing the amount of liquid in the vessel and for sending signals when such amount reaches a predetermined value to open the valve and discharge the liquid from the vessel and to close the valve when the amount of liquid in the vessel decreases to a predetermined value; means for discharging the liquid faster than it enters the vessel through the inlet; means recording the time the valve remains closed while the predetermined amount of liquid is accumulating in the vessel; and means for recording the number of times the liquid is discharged from the vessel to thereby record the total amount of liquid accumulated in the vessel during the time indicated on the time recording means thereby determining the rate of flow of the liquid into the vessel, said means comprising a pulse generator, means to record the number of pulses generated by the pulse generator, a relay which in normal position has a pair of normally open and a pair of normally closed contacts, a first circuit connecting the source of power to the pulse generator through the normally open contacts, a second circuit connecting the relay to the sensing means through the normally closed contacts so that the relay closes the normally open contacts upon receiving a signal from the sensing means and also opens the normally closed contacts whereby spurious signals from the sensing means do not have any effect upon the pulse generator, and means responsive to the pulse generator for actuating said relay to return it to normal position upon the pulse generator having emitted a pulse or predetermined number of pulses.

11. The meter of claim 10 wherein the means responsive to the pulse generator includes a stepping switch; a third circuit connecting a source of power to the relay through a preselected contact on the stepping switch so that upon the latter stepping a predetermined number of times, power will be applied to the relay to return it to normal position; and a circuit connecting the stepping switch to the pulse generator to cause the switch to step each time a pulse is emitted.

12. The meter of claim 11 wherein the third circuit includes a selector switch having its points connected in parallel to the points of the stepping switch so that the number of pulses emitted for each discharge of liquid from the vessel can be readily adjusted.

13. The meter of claim 11 wherein the relay has another pair of contacts and a circuit between a power source and the stepping switch to cause the latter to "home" upon the relay returning to its normal position.

References Cited in the file of this patent

UNITED STATES PATENTS

| | | |
|---|---|---|
| 2,614,578 | Stickney | Oct. 21, 1952 |
| 2,794,342 | Franklin | June 4, 1957 |
| 2,831,350 | Banks et al. | Apr. 22, 1958 |
| 2,876,639 | Loizzo et al. | Mar. 10, 1959 |
| 2,954,167 | Williams | Sept. 27, 1960 |